C. C. CLARK.
COUPLING DEVICE.
APPLICATION FILED JULY 19, 1912.

1,053,277.

Patented Feb. 18, 1913.

WITNESSES

INVENTOR
Cyrus C. Clark.
W. C. Carman
Attorney

UNITED STATES PATENT OFFICE.

CYRUS C. CLARK, OF STOUGHTON, WISCONSIN.

COUPLING DEVICE.

1,053,277.   Specification of Letters Patent.   Patented Feb. 18, 1913.

Application filed July 19, 1912. Serial No. 710,517.

*To all whom it may concern:*

Be it known that I, CYRUS C. CLARK, a citizen of the United States, residing at Stoughton, in the county of Dane and State of Wisconsin, have invented certain new and useful Improvements in Coupling Devices, of which the following is a specification.

The present invention relates to certain new and useful improvements in coupling devices such as are adapted to be employed for attaching hay loaders or other trailing devices to a hay rack or vehicle.

Among the objects of the invention is to provide a coupling device of this character which includes a coupling bracket embodying novel features of construction whereby it can be easily and quickly attached to or removed from the reach of any hay loader or vehicle, thereby enabling the coupling device to be employed in connection with any one of a number of vehicles without the necessity of duplicating the parts and providing each of the vehicles with a complete coupling member.

A further object of the invention is to provide a coupling device which is comparatively simple and inexpensive in its construction, which is positive and reliable in its operation, and which admits of the hay loader or other trailer being quickly attached to or detached from the vehicle.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1:
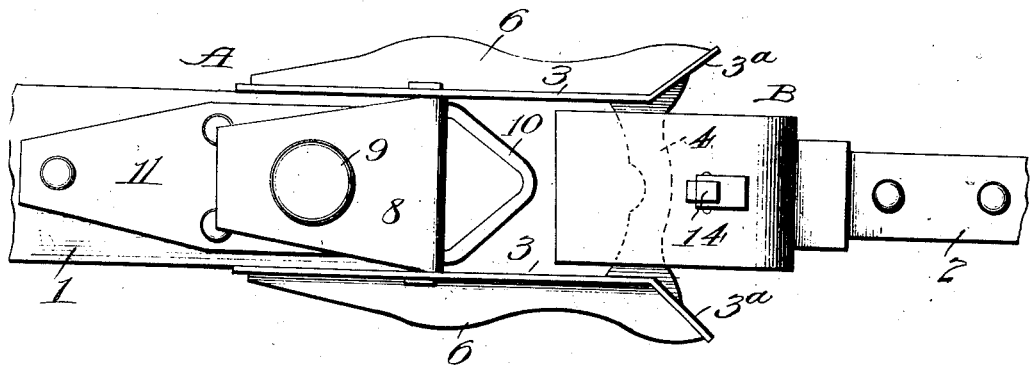
Figure 2:
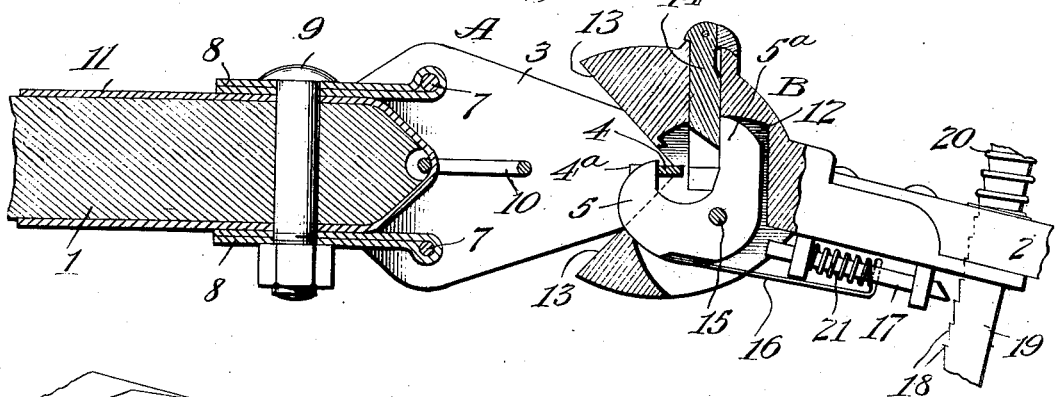
Figure 3:
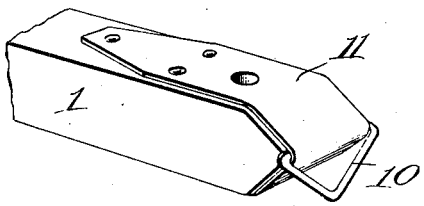
Figure 4:
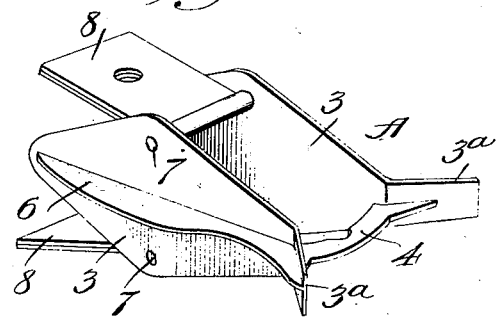

Figure 1 is a top plan view of a coupling device constructed in accordance with the invention. Fig. 2 is a vertical longitudinal sectional view through the same. Fig. 3 is a detail perspective view of the end of the vehicle reach to which the coupling bracket or member is designed to be attached, and Fig. 4 is a detached perspective view of the coupling member which is adapted to be applied to the vehicle reach.

Corresponding and like parts are referred to in the following description and indicated in all the views of the drawings by the same reference characters.

Referring to the drawing, the numeral 1 designates a wagon reach of the usual construction, and 2 the tongue of a hay loader or similar trailing device, a pair of coöperating coupling members A and B being applied respectively to the wagon reach and hay loader tongue.

The peculiar construction of the coupling member A whereby it can be so readily applied to or removed from a wagon reach is the essential feature of the invention upon which it is more particularly desired to obtain protection. This coupling member A comprises a pair of spaced and substantially parallel side plates 3 which are adapted to be applied to opposite sides of the reach 1 and project beyond the extremity thereof. The free ends of the side plates 3 are flared at 3ª and connected by a cross bar or horizontal web 4. The coupling member B is provided with a knuckle 5 adapted to engage the notched middle portion 4ª of the web 4, and the flared ends 3ª of the side plates 3 serve to direct the coupling member B into a proper engagement with the cross piece or web 4. The plates 3 are provided upon the outer faces thereof with the longitudinally extending reinforcing ribs 6 which also engage the flared ends 3ª of the plates and coöperate with the ends of the horizontal web 4 to hold the said flared ends of the plates rigidly in position.

It will be observed that the side plates 3 are widest at an intermediate point in their length and gradually decrease in width toward the opposite ends thereof. The wide intermediate portions of the side plates 3 are connected by the transverse pins 7 upon which the clamping wings 8 are pivotally mounted, the said clamping wings being adapted to engage the top and bottom of the reach 1. The rear ends of the side plates 3 fit against and engage opposite sides of the reach 1, while the clamping plates 8 are swung against the top and bottom of the reach and retained securely in position by means of some fastening member such as the bolt 9 which is shown as passing through the reach and the clamping wings. In the present instance, the reach is shown as provided with the usual coupling ring 10 which is held in position by means of the strap 11, although this constitutes no part of the present invention and is not essential to the successful operation of the coupling device.

The bolt 9 serves to hold the coupling member A securely upon the reach 1, although by removing the bolt the coupling member can be readily detached from the reach, should such become desirable.

The coöperating coupling member B may be of any suitable construction and is adapted to be permanently applied to the tongue 2 of the hay loader or other trailing device. This coupling member B is shown as formed with a socket 12 and a pair of flared jaws 13 diverging outwardly away from the socket, the said jaws being adapted to engage the cross piece 4 of the coupling member A and direct the same into engagement with the knuckle 5. This knuckle 5 is formed with a tail 5ª adapted to be engaged by a sliding latch 14 to hold the knuckle in operative position. When it is desired to disconnect the coupling members, it is merely necessary to slide the latch 14 upwardly out of engagement with the tail 5ª so as to release the knuckle 5. This knuckle 5 is pivoted within the socket 12 upon a pivot pin 15, the lower portion of the knuckle being loosely connected to a link 16 which engages a sliding detent 17. The beveled nose of this sliding detent 17 is adapted to engage the teeth 18 of a rod 19 which passes loosely through the tongue 2, the upper end of the rod being adapted to be connected in the usual manner to the upper part of the loading frame. This rod 19 merely constitutes the usual means for holding the hay loader in position where the tongue is supported otherwise than by a leg, a spring 20 which is arranged above the tongue 2 normally tending to push the rod 19 upwardly. A spring 21 normally tends to force the detent 17 into operative position, although the leg 16 serves to hold the detent 17 out of engagement with the rack 18 when the knuckle 5 is in operative position. However, as soon as the knuckle 5 is released, the detent 17 will be permitted to engage the rack 18 so as to retain the rod 19 against excessive upward sliding movement. This, however, constitutes no part of the present invention and may be of any conventional construction, since the exact manner of constructing the coupling member B is immaterial.

The coupling member A may be quickly applied to any one of a number of vehicles and is always held rigidly in position by means of the clamping action of the wings 8 and bolt 9. This admits of the coupling member A being quickly shifted from one vehicle to another vehicle, and also enables the device to be applied in connection with any vehicle which the farmer or prospective user may have.

Having thus described the invention, what I claim as new and desire to secure by Letters Patent, is:—

1. A coupling member including a pair of spaced and substantially parallel side plates adapted to be fitted against opposite sides of a wagon reach and to project beyond the wagon reach, a transverse coupling web connecting the projecting ends of the side plates, transverse pins connecting intermediate portions of the side plates, clamping wings hinged upon the transverse pins and adapted to be swung into engagement with the top and bottom of the wagon reach, and a fastening member for holding the clamping wings in position.

2. A coupling member including a pair of spaced and substantially parallel side plates adapted to be applied to opposite sides of a wagon reach and to project beyond the same, the projecting ends of the plates being flared outwardly away from each other, a transverse coupling web connecting the flared ends of the side plates, longitudinal reinforcing ribs extending along the outer faces of the side plates and also along the flared ends thereof so as to coöperate with the transverse coupling web to hold the flared ends of the plates rigidly in position, transverse pins connecting intermediate portions of the side plates, clamping wings hinged upon the transverse pins and adapted to be swung against the top and bottom of the wagon reach, and a fastening member extending through the wagon reach and engaging the clamping wings to retain the coupling member rigidly in position.

3. A coupling member including spaced and substantially parallel side plates adapted to be applied to opposite sides of a wagon reach and to project beyond the wagon reach, the said plates gradually tapering in width toward opposite ends thereof and the projecting ends thereof being flared outwardly, a transverse coupling bar connecting the flared ends of the side plates, longitudinal ribs extending along the outer faces of the side plates and also engaging the flared ends thereof, spaced transverse pins connecting the wider intermediate portions of the side plates, clamping wings hinged upon the transverse pins and adapted to engage the top and bottom of the wagon reach, and a fastening member for holding the clamping wings in position.

In testimony whereof I hereunto affix my signature in the presence of two witnesses.

CYRUS C. CLARK.

Witnesses:
G. L. GIBBS,
H. C. CONE.